(12) United States Patent
Kim et al.

(10) Patent No.: US 8,494,513 B2
(45) Date of Patent: Jul. 23, 2013

(54) SPATIO-TEMPORAL RANDOM VOTING SCHEME FOR COGNITIVE NETWORKS

(75) Inventors: Yong Jin Kim, San Diego, CA (US); Lakshminath R. Dondeti, Hyderabad (IN); Stephen J. Shellhammer, Ramona, CA (US); Wenyi Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 694 days.

(21) Appl. No.: 12/553,955

(22) Filed: Sep. 3, 2009

(65) Prior Publication Data

US 2010/0105419 A1    Apr. 29, 2010

Related U.S. Application Data

(60) Provisional application No. 61/109,091, filed on Oct. 28, 2008.

(51) Int. Cl.
*H04W 24/00* (2009.01)

(52) U.S. Cl.
USPC ........... 455/425; 455/423; 455/424; 455/418; 455/420; 455/452.1; 455/452.2; 455/453; 455/456.1; 455/456.3; 455/456.5; 455/67.11; 455/67.13; 455/67.7; 455/68; 455/69; 370/236; 370/236.1; 370/236.2; 370/241; 370/241.1; 370/329; 370/332

(58) Field of Classification Search
USPC ... 455/405, 418–420, 423–425, 456.1–456.6, 455/67.11, 67.13–67.15, 67.7, 68–69, 452.1, 455/452.2, 453; 370/236, 236.1, 236.2, 241, 370/241.1, 329, 332
See application file for complete search history.

(56) References Cited

U.S. PATENT DOCUMENTS 5,805,666 A * 9/1998 Ishizuka et al. .............. 379/1.01
6,088,588 A * 7/2000 Osborne ....................... 455/425
(Continued)

FOREIGN PATENT DOCUMENTS

CN          1829385 A      9/2006
CN        101257714 A      9/2008
(Continued)

OTHER PUBLICATIONS

Anh Tuan Hoang et al: "Adaptive Scheduling of Spectrum Sensing Periods in Cognitive Radio Networks" Global Telecommunications Conference, 2007. Globecom '07. IEEE, IEEE, Piscataway, NJ, USA, Nov. 1, 2007, pp. 3128-3132, XP031196520 ISBN: 978-1-4244-1042-2 the whole document.

(Continued)

*Primary Examiner* — Tuan A Tran
(74) *Attorney, Agent, or Firm* — Won Tae Kim

(57) ABSTRACT

A spatio-temporal random voting scheme is provided that incorporates location distribution, spatial randomness, and temporal randomness in the collection of information from a plurality of sensing devices within the cognitive network. The region is divided into a plurality of sectors, where each sector is a portion of the region. A subset of sectors is selected from the plurality of sectors in the region to provide spatial randomness. A device is randomly selected from each sector in the subset of sectors to provide additional spatial randomness to the information collection process. Temporal randomness may be introduced by randomly selecting a timeslot within a sensing window period in which devices are to scan a frequency spectrum band to determine if a signal energy above a threshold is detected. Sensing reports are then collected from the selected sensing devices and used to determine whether the frequency spectrum band is available or in use.

15 Claims, 8 Drawing Sheets

U.S. PATENT DOCUMENTS

| | | | | |
|---|---|---|---|---|
| 6,112,236 | A * | 8/2000 | Dollin et al. | 709/224 |
| 6,219,544 | B1 * | 4/2001 | Suutarinen | 455/423 |
| 6,308,071 | B1 * | 10/2001 | Kalev | 455/446 |
| 6,434,364 | B1 * | 8/2002 | O'Riordain | 455/67.11 |
| 7,043,237 | B2 * | 5/2006 | Snyder et al. | 455/425 |
| 7,289,453 | B2 * | 10/2007 | Riedel et al. | 370/252 |
| 2001/0049263 | A1 * | 12/2001 | Zhang | 455/67.1 |
| 2004/0047324 | A1 | 3/2004 | Diener | |
| 2007/0104140 | A1 | 5/2007 | Ashish et al. | |
| 2007/0249341 | A1 | 10/2007 | Chu et al. | |
| 2007/0253394 | A1 | 11/2007 | Horiguchi et al. | |
| 2008/0076450 | A1 | 3/2008 | Nanda et al. | |
| 2008/0090581 | A1 | 4/2008 | Hu | |
| 2008/0233991 | A1 | 9/2008 | Gillig et al. | |

FOREIGN PATENT DOCUMENTS

| | | |
|---|---|---|
| JP | 2007088941 A | 4/2007 |
| WO | WO2006020405 | 2/2006 |
| WO | WO2008086243 | 7/2008 |

OTHER PUBLICATIONS

Chia-Han Lee et al: "Energy Efficient Techniques for Cooperative Spectrum Sensing in Cognitive Radios" Consumer Communications and Networking Conference, 2008. CCNC 2008. 5TH IEEE, IEEE CCP, Piscataway, NJ, USA, Jan. 1, 2008, pp. 968-972, XP031212032 abstract p. 968, left-hand column, line 23-line 32page 969, left-hand column, line 21-line 42 figures 1(a)-1(d).

Hang Su et al: "Cognitive Radio Based Multi-Channel MAC Protocols for Wireless Ad Hoc Networks" Global Telecommunications Conference, 2007. Globecom '07. IEEE, IEEE, Piscataway, NJ, USa, Nov. 1, 2007, pp. 4857-4861, XP031196849 ISBN: 978-1-4244-1042-2 the whole document.

Hyun-Ju Kim et al: "Cognitive Radio MAC Protocol for Hidden Incumbent System Detection" Jan. 23, 2007, Information Networking. Towards Ubiquitous Networking and Services, Springer Berlin Heidelberg, Berlin, Heidelberg, p. 80-89 , XP019111923 ISBN: 9783540895237 the whole document.

International Search Report and Written Opinion—PCT/US2009/062278, International Searching Authority—European Patent Office, May 27, 2010.

Jookwan Lee et al: "Weighted-Cooperative Spectrum Sensing Scheme using Clustering in Cognitive Radio Systems" Advanced Communication Technology, 2008. ICACT 2008. 10th International Conference on, IEEE, Piscataway, NJ, USA, Feb. 17, 2008, pp. 786-790, XP031245247 abstract p. 786, left-hand column, line 38—p. 788, left-hand column, line 44 p. 789, left-hand column, line 11 figures 2,3.

Keqin Liu et al: "Distributed Sensing and Access in Cognitive Radio Networks" Spread Spectrum Techniques and Applications, 2008. ISSSTA '08. IEEE 10th International Symposium on, IEEE, Piscataway, NJ, USA, Aug. 25, 2008, pp. 23-27, XP031318976 ISBN: 978-1-4244-2203-6 the whole document.

Kyounghwan Lee et al: "Throughput Enhancing Cooperative Spectrum Sensing Strategies for Cognitive Radios" Signals, Systems and Computers, 2007. ACSSC 2007. Conference Record of the Forty-First Asilomar Conference on, IEEE, Piscataway, NJ, USA, Nov. 4, 2007, pp. 2045-2049, XP031242432 ISBN: 978-1-4244-2109-1 the whole document.

Lifeng Lai et al: "Optimal medium access protocols for cognitive radio networks" Modeling and Optimization in Mobile, Ad Hoc, and Wireless Networks and Workshops, 2008. WIOPT 2008. 6th International .Symposium on, IEEE, Piscataway, NJ, USA, Apr. 1, 2008, pp. 328-334, XP031295911 ISBN: 978-963-9799-18-9 the whole document.

Partial International Search Report PCT/US09/062278, International Search Authority—European Patent Office—Feb. 22, 2010

European Search Report, EP12000057—International Search Authority—Munich—Dec. 3, 2012.

Chen R., et al., "Robust Distributed Spectrum Sensing in Cognitive Radio Networks," IEEE INFOCOM 2008, Apr. 18, 2008, pp. 31-35.

Taiwan Search Report—TW098136570—TIPO—Oct. 19, 2012-10-19.

* cited by examiner

US 8,494,513 B2

SPATIO-TEMPORAL RANDOM VOTING SCHEME FOR COGNITIVE NETWORKS

CLAIM OF PRIORITY UNDER 35 U.S.C. §119

The present Application for Patent claims priority to U.S. Provisional Application No. 61/109,091 entitled "Grid-Based Spatio-Temporal Random Voting", filed Oct. 28, 2008, assigned to the assignee hereof and hereby expressly incorporated by reference herein.

BACKGROUND

1. Field

One feature relates to determining spectrum availability in wireless communication systems, and more particularly, to a zone or grid based voting method to determine the usage of a frequency spectrum band or channel based on reports from user sensing devices.

2. Background

In some wireless networks, it may be beneficial for the network to determine which channels or bands of a frequency spectrum may be in use by others and therefore avoid such channels or bands. For example, in cognitive radio networks, primary signal information from sensing devices is reported to an information center (e.g., Base station). Then, based on the reports, the information center infers whether there exists a primary signal or not. If not, the information center sends a control signal to each device to use the spectrum band or channel since it is vacant. Otherwise, the information center and/or sensing devices refrain from using the spectrum band.

To disrupt normal service, an attacker can generate a fake primary signal or mask a primary signal. By faking the primary signal, an innocent user (device) may never be able to use an otherwise vacant spectrum band. On the other hand, by masking the primary signal, an unknowing device may start using the spectrum band thereby disrupting incumbent user (e.g., devices currently using the spectrum band). Hence, a voting scheme may be utilized to filter out the fake signals or masking. The simplest voting scheme is to gather all the sensing information (N) from each device and infer that there exist a primary signal if the number of primary signals (m) exceeds certain threshold (i.e., $m/N > \alpha$).

Two prior art voting schemes include Simple Majority Voting and Absolute Majority Voting. The simple majority voting scheme is a form of voting where, given two options, the option receiving the most votes wins. Absolute majority voting is another form of voting scheme where the winner is the option that gets more than half of all possible votes including abstentions. In the cognitive radio network context, the two report options are: (1) primary signal exist or (2) primary signal does not exist.

Both of these prior art voting schemes are not appropriate for cognitive radio networks as they are susceptible to disruption and security risks by attackers. Consequently, a voting scheme is needed to determine whether a spectrum band is in use while mitigating the possibility of an attacker.

SUMMARY

A method for collecting information from a plurality of sensing devices in a cognitive wireless network is provided. A zone-based and/or grid-based spatio-temporal random voting scheme is used to incorporate location distribution, spatial randomness, and temporal randomness in the collection of information from a plurality of devices within the network.

A region is mapped into a plurality of sectors, where each sector is a portion of the region. In various implementations, the plurality of sectors may be of approximately equal area or each sector in the plurality of sectors may be selected to encompass approximately the same number of sensing devices on average. A subset of sectors may be selected from the plurality of sectors. For instance, the subset of sectors may be randomly selected from the plurality of sectors so as to achieve spatial randomness. A sensing device from within each sector in the subset of sectors may be selected from which to collect frequency spectrum usage information. The sensing device within each selected sector may be randomly selected so as to achieve intra-sector spatial randomness. In one example, the same number of sensing devices from each sector in the subset of sectors may be used to collect information. Selecting a sensing device from within each sector in the subset of sectors may include: (a) selecting a location within each sector in the subset of sectors, (b) identifying a first device that is closest to that location, and/or (c) requesting that first device to scan a particular spectrum band and indicate whether signal energy above a particular threshold is detected.

A time slot may be randomly selected within a sensing window period. The sensing window period may have a fixed time interval, but the start of the time slot may be randomly selected for each sensing window period. This time slot may be the period in which the devices are instructed to scan a spectrum band for signal energy above a particular threshold. A message may then be sent to the selected sensing devices to collect frequency spectrum usage information at the selected time slot for a particular frequency spectrum band, where the collected sensing reports include the frequency spectrum usage information.

Sensing reports may be collected from the selected sensing devices, where each sensing report is indicative of whether the sensing device detected a signal energy above a particular threshold in a particular spectrum band. The sensing reports may be collected so as to achieve temporal randomness. A determination can then be made as to whether the desired spectrum band can be used based on the sensing reports. For example, the desired frequency spectrum band can be used if the number of sensing reports indicating detection of a signal energy above the threshold is less than half of all collected sensing reports.

Additionally, a method operational in a sensing device is provided for obtaining frequency spectrum usage information for a cognitive wireless network. A message may be received from the cognitive wireless network to collect frequency spectrum usage information at a defined time slot for a particular frequency spectrum band. Frequency spectrum usage information is then collected by each sensing device at the indicated time slot by scanning the particular spectrum band to determine whether a signal energy above a particular threshold is detected. The sensing device may also obtain a geographical position for the sensing device. A sensing report is generated that includes at least one of the frequency spectrum usage information and the geographical position. The sensing device may then send the sensing report to the collection center. Subsequently, the sensing device may receive a transmission from the cognitive wireless network on the frequency spectrum band if the collection center determines that the frequency spectrum band is unused.

DETAILED DESCRIPTION

In the following description, specific details are given to provide a thorough understanding of the embodiments. However, it will be understood by one of ordinary skill in the art that the embodiments may be practiced without these specific details. For example, circuits may be shown in block diagrams, or not be shown at all, in order not to obscure the embodiments in unnecessary detail. In other instances, well-known circuits, structures and techniques may not be shown in detail in order not to obscure the embodiments.

Overview

A zone or grid based spatio-temporal random voting scheme is provided that incorporates location distribution, spatial randomness, and temporal randomness in the collection of information from a plurality of sensing devices within the cognitive network. The region is divided into a plurality of sectors, where each sector is a portion of the region. A subset of sectors is selected from the plurality of sectors in the region to provide spatial randomness. A device is randomly selected from each sector in the subset of sectors to provide additional spatial randomness to the information collection process. Moreover, temporal randomness may be introduced by randomly selecting a timeslot within a sensing window period in which devices are to scan a frequency spectrum band to determine if a signal energy above a threshold is detected. Sensing reports are then collected from the selected sensing devices and used to determine whether the frequency spectrum band is available or in use.

Cognitive Network Environment and Potential Security Risks

Figure 1:
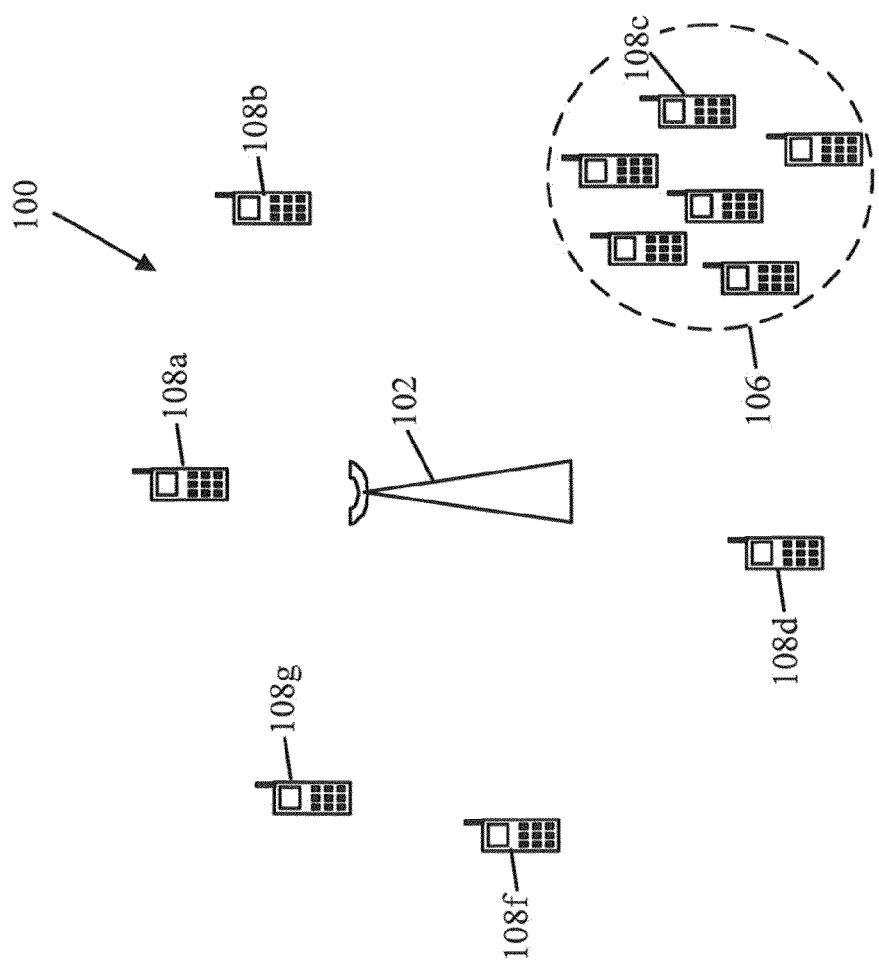
FIG. 1 is a block diagram illustrating an example of a cognitive network in which one or more novel features may be implemented.

FIG. 1 is a block diagram illustrating an example of a cognitive network in which one or more novel features may be implemented. The cognitive network 100 may include one or more access point(s) 102 that provide wireless service to one or more devices 106 and 108a-g. That is, the access point(s) 102 may allow the devices 106 and 108a-g to communicate with each other or with other devices on other networks. The devices 106 and 108a-g may include, for example, access terminals, mobile/wireless communication devices, cellular phones, personal digital assistants, mobile computing devices, pagers, among others. The cognitive network 100 may be able to perceive current network conditions, plan, decide, act on those conditions, and/or learn from the consequences of its actions, among other features. Such network conditions may include, for example, frequency and/or channel usage at any particular time. For example, where a frequency space is unallocated (e.g., the frequency space or band is available for use by various devices or parties without prior arrangement or allocation), the cognitive network 100 would ideally avoid using a frequency channel or band (within the unallocated frequency space) that is being used by other devices (e.g., for purposes other than communicating over the cognitive network). Consequently, the cognitive network 100 may use devices in the network to provide reports indicating network conditions, including which frequency channels or bands may be in use by others. The cognitive network 100 can then avoid using a frequency channel or band within the network or in one or more regions or sectors of the network where a conflicting use is reported.

To collect wireless network conditions, the network 100 may request, collect, and/or receive information from the one or more devices 106 and 108a-g. However, because the cognitive network 100 attempts to learn such network conditions from the devices 106 and 108a-g, it may be susceptible to misinformation and/or attacks.

Such collection of network information may be performed, for example, using a voting scheme. However, there are several security problems when applying prior art voting schemes, such as Simple Majority Voting and Absolute Majority Voting, to a cognitive network.

A first security problem is that if a majority (or a large number) of sensing devices are located within the same sub-region, the voting scheme can be manipulated by an attacker and may fail. More specifically, a large number of devices may be located within a high-density region that is part of a larger sensing region. An attacker can use a lower-power fake or masked primary signal within the high-density region to fake the devices within that high-density region into believing that a primary signal is or is not present (when the opposite is true). If the number of sensing devices in the high-density region is greater than the number of devices in the remaining parts of the sensing region, this may allow an attacker to succeed in having a spectrum band appear to be in use (when it is not) or appear not to be in use (when it is). For instance, if a threshold value ($\alpha$) is set to five (5), an attacker may easily compromise five or more devices within the high-density region using a low-power fake primary signal to cause the vote to fail.

A second security problem is that the sensing reports from sensing devices can cause redundant overhead transmissions if the reports are sent from every device in a wireless network. A solution to address this issue is sampling the sensing information. However, if the sampling is done based on a device ID, this can still cause geographically-biased or skewed sampling and an attacker can try to compromise the sampled sensing devices. For example, an attacker may try to obtain closely numbered device IDs and send fake reports when it is sampled.

A third security problem is that if device sensing is done at regular time intervals (e.g., every T seconds) during a fixed time slot (e.g., lasting $\beta$ seconds); an attacker can manipulate a fake/masked primary signal only during the fixed time slot to reduce its attack time and power consumption. Reducing attack time/power has the side-effect of making it harder to trace back an attacker.

Zone-Based Information Collection

Figure 2:
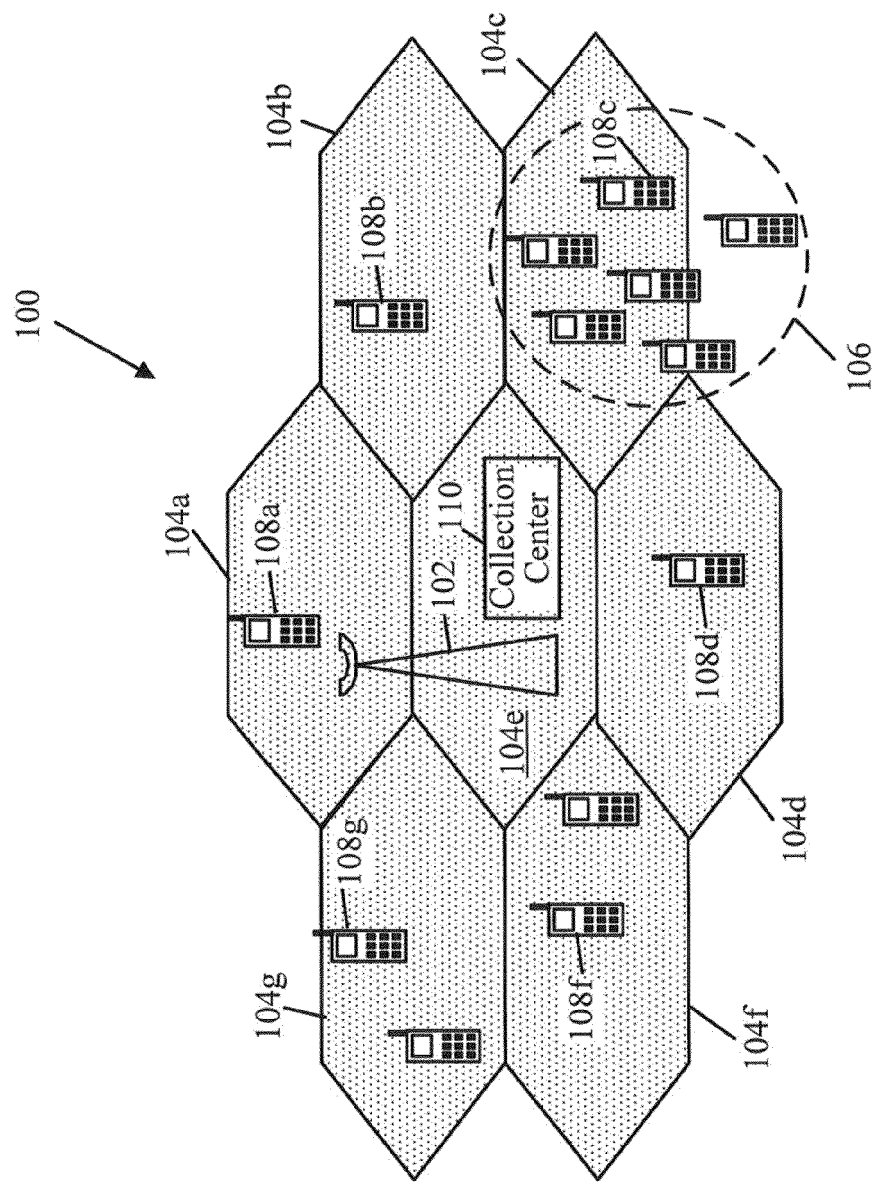
FIG. 2 is a block diagram illustrating the cognitive network of FIG. 1 in which an example of zone-based voting is utilized for information collection from a plurality of devices in the network.

FIG. 2 is a block diagram illustrating the cognitive network of FIG. 1 in which an example of zone-based voting is utilized for information collection from a plurality of devices in the network. In this zone-based voting scheme, a network region is sub-divided into a plurality of zones or sectors 104a, 104b, 104c, 104d, 104e, 104f, and 104g. The information may be gathered through one or more access points 102 (e.g., one access point per region or one access point covering a plurality of regions). Note that, in one example, each sector may be defined by location boundaries. Thus, devices that report a position within the boundaries of a sector are considered to be within that sector. An information collection center 110 collects the reports from sensing devices in the network 100, where such reports are indicative of one or more network conditions (e.g., spectrum usage, traffic, noise, interference, etc.).

In one example, the collection center 110 may obtain N reports from each sector 104a-g, where N is an integer equal to 1 or greater. Note that such reports may be obtained from sectors that include at least N sensing devices. For the instance where N=1, the collection center 110 may obtain reports from sensing devices 108a, 108b, 108c, 108d, 108f, and 108g in sectors 104a, 104b, 104c, 104e, 104f and 104g; no sensing devices are located in sector 104e. However, the collection center 110 may require that a minimum number of sectors be used in the voting scheme, so that a single sector is not the only one providing the report(s). This voting scheme prevents a high concentration of sensing devices (like devices 106) in one sector 104c from having a disproportionate effect on the voting results.

According to various implementations, a report may be obtained from a sensing device in various ways. For example, the collection center 110 may select a sensing device(s) in each sector 104 and send a request to the selected device(s) in each sector to provide a report. The selected device(s), upon receiving such request, collects and/or sends the requested report to the collection center 110. Alternatively, some or all of the devices in the network may be configured to automatically, regularly, and/or sporadically, collect network information and send reports to the collection center 110. The collection center 110 may randomly, pseudo-randomly, and/or systematically select which reports from each sector to use in the voting scheme.

Grid-Based Information Collection

Figure 3:
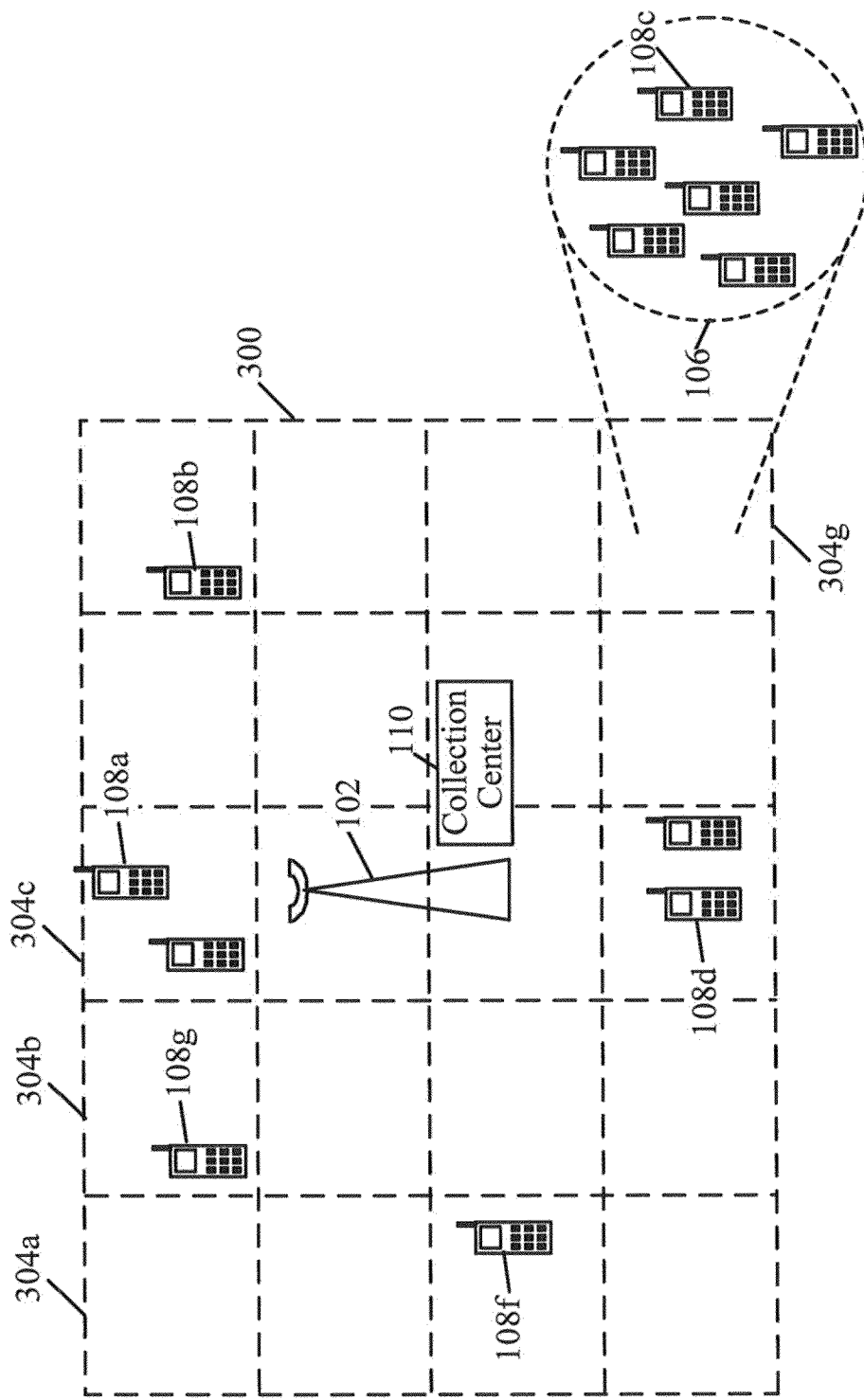
FIG. 3 is a block diagram illustrating the cognitive network of FIG. 1 in which an example of grid-based voting is utilized for information collection from a plurality of devices in the network.

FIG. 3 is a block diagram illustrating the cognitive network of FIG. 1 in which an example of grid-based voting is utilized for information collection from a plurality of devices in the network. In this grid-based voting scheme, a network region is sub-divided into a grid 300 of contiguous cells or sectors 304 of approximately equal area. Network information may be gathered through one or more access points 102 (e.g., one access point per region or one access point covering a plurality of regions). Note that, in one example, each sector 304 may be defined by location boundaries. Thus, devices that report a position within the boundaries of a sector 304 are considered to be within that sector. The information collection center 110 collects the reports from sensing devices in the network 100, where such reports are indicative of one or more network conditions (e.g., spectrum usage, traffic, noise, interference, etc.).

In one example, the collection center 110 may obtain N reports from each sector 304, where N is an integer equal to one (1) or greater. Note that such reports may be obtained from cells that include at least N sensing devices. However, the collection center 110 may require that a minimum number of sectors be used in the voting scheme, so that a single sector is not the only one providing the report(s) or the majority of the reports. Additionally, the collection center 110 may restrict the number of reports used from any particular sector so as thwart attackers that try to bias the voting by using many devices in a sector to send fake reports. For instance, while sector 304g may have a high concentration of sensing devices 106, the collection center 110 just uses a collection report from one device 108c so as not to disproportionately overshadow the voting or reports from other sectors (e.g., where the collection center is using just one report from other sectors). Consequently, in one example, the collection center 110 utilizes the same number of reports from each sector (at least for sectors that have at least a minimum number of sensing devices).

Additionally, in some implementations, the collection center 110 may randomly select which reports from devices in each sector are to be used at any one particular time. For example, the collection center 110 may randomly select one or more of the devices 106 in the sector 304g each time reports are collected. Thus, a different device from the plurality of devices 106 may be used each time reports are collected by the collection center 110.

The zone and/or grid based information collection methods illustrated in FIGS. 2 and 3 facilitate a voting scheme that thwarts attackers. For example, even if devices are densely located or clustered in one sector (e.g., sector 104c of FIG. 2 or sector 304g of FIG. 3), only one sensing report from that specific sector is counted in the voting scheme. Another advantage of a zone or grid based information collection scheme is that even if sensing devices are mobile, network information from those devices can still be collected since they are located within even distributed regions or sectors.

Note that, in some implementations of the zone and/or grid based information collection methods, the sectors of a network region may be defined to be approximately the same area. In other implementations, the sectors may be defined to be of different sizes. For instance, the sectors of different sizes (area) may be selected so that they encompass approximately the same number of sensing devices at any one time or on average.

Additionally, another factor that may be considered in selecting the area of a sector is the expected range of interfering devices. That is, if the unallocated frequency space used by a cognitive wireless network for relatively long distance communications is also used by interfering devices for relatively short range transmission, then the area of the sectors may be defined to approximately coincide with the range of the short range transmissions. This way, if a particular frequency channel is identified as being in use by other devices or applications in a particular sector, the collection center (and other components of the cognitive network) may avoid using the identified frequency channel for communications at, near, or adjacent to the sector(s) in which the frequency channel is already being used by other devices or applications.

Spatial Randomness Information Collection

According to another feature, the cognitive network 100 may implement spatial randomness when collecting network information from devices. The zone or grid based random voting scheme of FIGS. 2 and 3 provide significant security advantages over a simple voting scheme. This is because information is gathered from geographically distributed regions (e.g., zones, sectors or cells) which allow secure voting even when device density variances are present among the regions. That is, by limiting the effect of regions with a high density of sensing devices and collecting information from a plurality of regions distributed across a network area, the effects of any fake reports provided by an attacker can be minimized or eliminated.

Two types or levels of spatial randomness may be implemented, i.e., region or sector based randomness and/or intra-sector randomness. In the case of region-based or sector-based randomness, the information collection center 102 may decide to use just a subset of the sectors in the network region to obtain sensing reports. Selecting just a subset of the sectors (in the network region) from which to collect information reduces communication overhead associated with requesting, transmitting, and/or collecting the reports. However, if a fixed subset of sectors is selected, an attacker may try to compromise the fixed subset of sectors. That is, if the fixed subset of grid sectors can be identified by an attacker, the attacker can then attempt to compromise the sensing reports from those sectors. Hence, sectors may be selected in a spatially random fashion. For instance, at a first information collection period, the information collection center 102 may pseudo-randomly or randomly select a first plurality of sectors from the available sectors in the network region, where the first plurality of sectors is a first subset of all available sectors in the network region. Subsequently, at a second information collection period, the information collection center 102 may pseudo-randomly or randomly select a second plurality of sectors from the available sectors in the network region, where the second plurality of sectors is a second subset of all available sectors in the network region and the second subset is different than the first subset. Consequently, since the sectors used each for each information collection period changes, it prevents an attacker from targeting just a few sectors in a network region.

Additionally, in the case of intra-sector randomness, a sensing device from which a sensing report is requested or obtained may be randomly selected inside each sector. In one example, for a given information collection period, the collection center 110 may determine the sensing devices present in a sector and randomly or pseudo-randomly selects one or more devices from which to obtain a report. In another example, the collection center 110 may randomly select a location $(x_r, y_r)$ within a sector and the sensing device that is closest to the selected location $(x_r, y_r)$ is used as the sensing device from which a sensing report is to be requested or obtained. In this manner, since the sensing device utilized for each sector is randomly selected for each information collection period, it prevents an attacker from targeting particular sending devices in the network. This intra-sector spatial randomness makes it difficult on the attacker to find and compromise a specific sensing device to achieve their goals.

Note that because fewer than all available sensing devices are used in the voting scheme, this save significant energy since the reports do not have to be collected and/or transmitted by every device in the cognitive wireless network.

Temporal Randomness Information Collection

According to yet another feature, temporal randomness may be implemented by the cognitive network. If the information collection period is within a periodic and fixed time slot (e.g., every T seconds during a time slot lasting a fixed time interval $\beta$), an attacker may try to disrupt report collection by jamming only that fixed time slot, which saves a lot of power and time for attacker. This also makes it more difficult to trace back an attacker. Consequently, one feature provides for using temporal random when sensing devices collect network information for reports.

Figure 4:
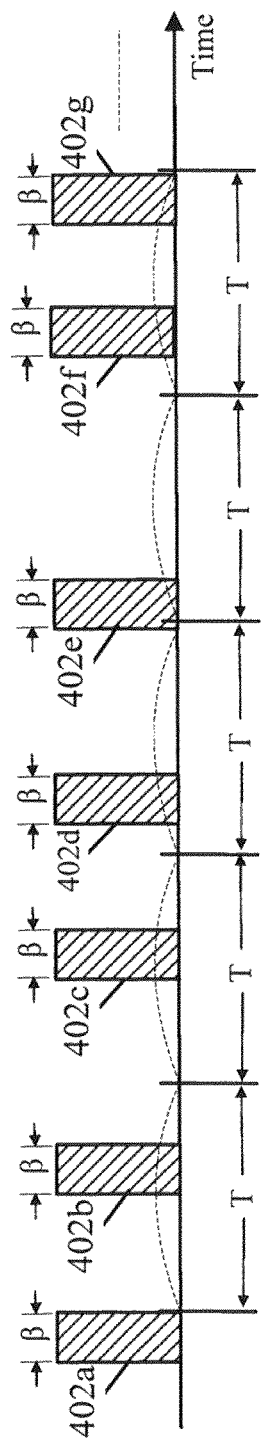
FIG. 4 illustrates an example of temporal random sensing where the sensing time slot occurs randomly within a time interval T and lasts a fixed time $\beta$.

FIG. 4 illustrates an example of temporal random sensing where the sensing time slot 402 occurs randomly within a time interval T and lasts a fixed time $\beta$. That is, within defined periods of time T, the time slot 402 (having a fixed interval $\beta$) is randomly selected each time the collection center 110 seeks to obtain reports from sensing devices so that an attacker cannot determine when the sensing device is sensing information (e.g., ascertaining frequency spectrum usage). During this time slots 402, the selected sensing devices may scan a frequency spectrum, band, and/or channel of interest and determine whether a signal above a particular threshold is present in the scanned frequency spectrum, band, and/or channel. Temporal randomness makes it difficult for an attacker to find the specific time slot during which a fake signal or masking signal should to be generated to affect a sensing device's information collection.

Example Information Collection Center

Figure 5:
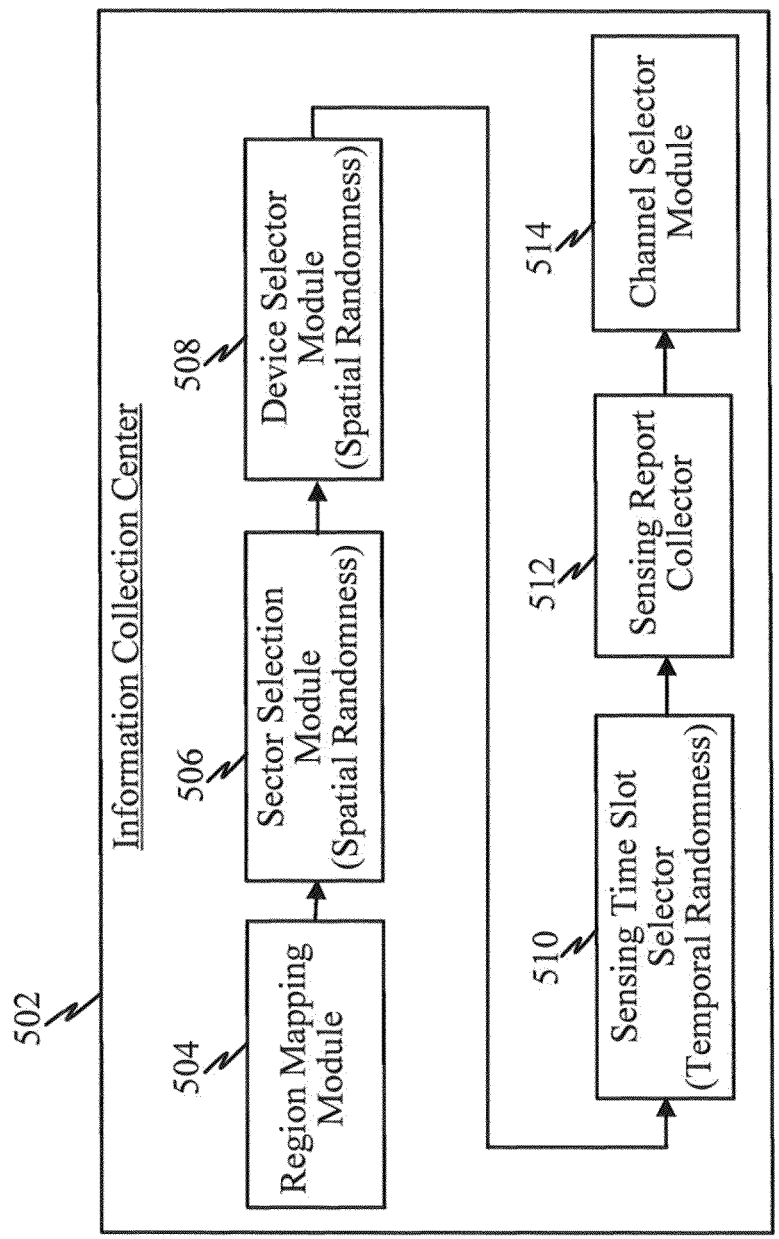
FIG. 5 is a block diagram illustrating an example of functions that may be performed by an information collection center for a cognitive wireless network.

FIG. 5 is a block diagram illustrating an example of functions that may be performed by an information collection center for a cognitive wireless network. The information collection center 502 may include a Region Mapping Module 504 that maps or divides a network region into multiple sectors. In one example, this may be accomplished simply by associating a different (directional) antenna covering a sub-region of a network with a particular sector. Alternatively, a region may be divided into a plurality of contiguous sectors of approximately equal area. In yet another alternative implementation, a region may be divided into a plurality of sectors of different areas but with approximately equal sensing devices operating therein.

A Sector Selection Module 506 may then select one or more sectors of the network region in a random or pseudo-random fashion. This provides spatial diversity or randomness in the selection of sectors from which the collection center 502 obtains sensing reports.

For each selected sector, a Device Selector Module 508 then selects a sensing device located within that selected sector from which to collect information. The Device Selector Module 508 provides additional spatial diversity or randomness to the voting scheme. Such collected information may indicate whether the selected sensing device in the selected sector detects or recognizes a signal above a certain threshold in a particular spectrum band or channel. Additionally a Sensing Time Slot Selector 510 may randomly or pseudo-randomly select when such information is collected. That is, during this time slot, the information collection center 502 may send a message to the selected sensing devices to scan a particular frequency spectrum band or channel for signals above a particular threshold. In an alternative implementation, each sensing device may scan the frequency spectrum band at random times and provides its latest report to the information collection center 502 when requested.

A Sensing Report Collector 512 then collects information received from the selected sensing devices. Based on the received sensing reports, a Channel Selector Module 514 may then determine whether the particular frequency spectrum band or channel can be used for new communications by the wireless network.

Note that the various modules of the information collection center 502 may be implemented as one or more circuits and/or processors.

Figure 6:
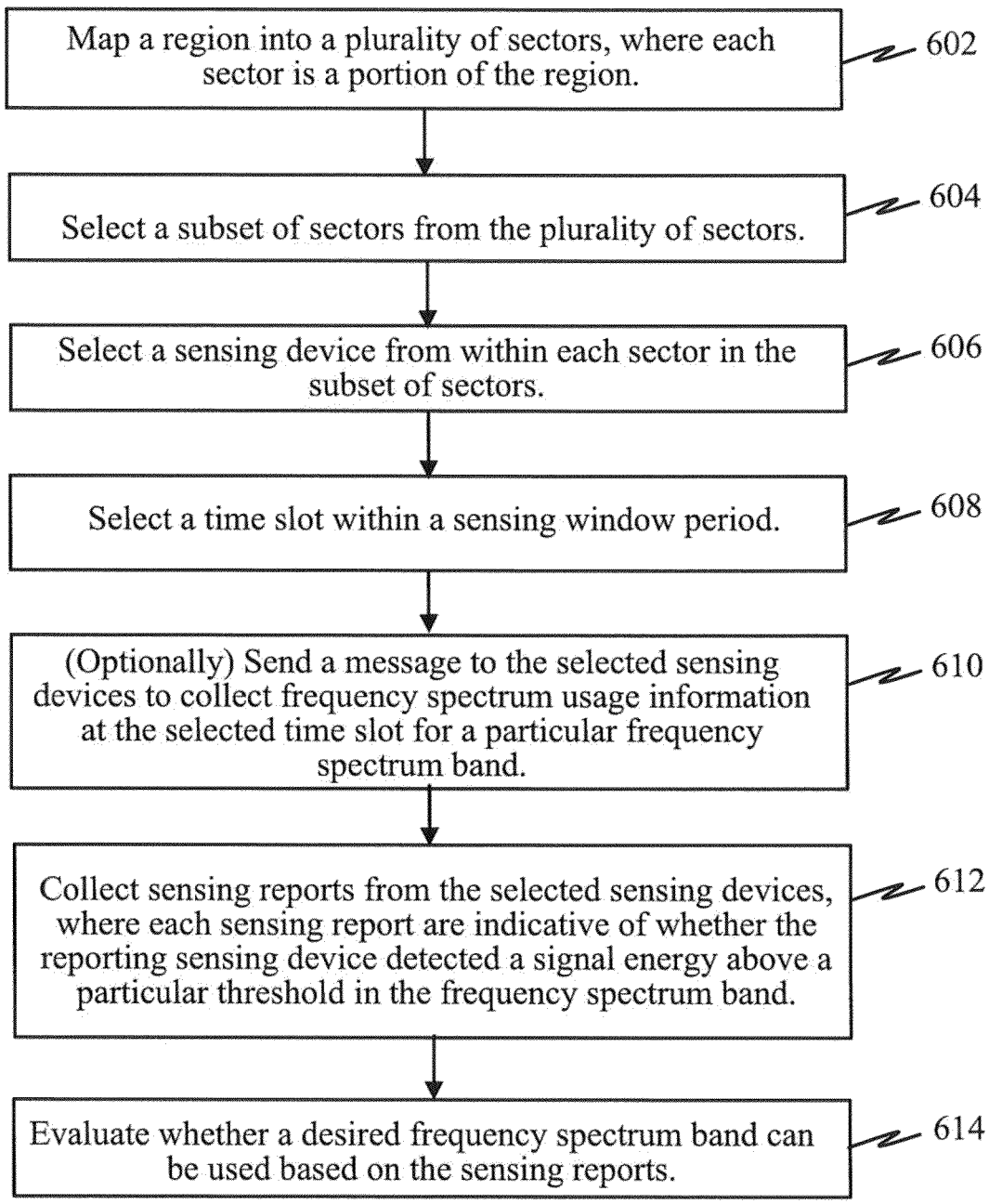
FIG. 6 is a diagram illustrating a method operational on an information collection center for collecting information from various sensing devices in a cognitive radio network to implement a voting scheme.

FIG. 6 is a diagram illustrating a method operational on an information collection center for collecting information from various sensing devices in a cognitive radio network to implement a voting scheme. This information may be used to determine whether a particular frequency or spectrum band can be used for communications or whether it is occupied by another user. A network region is mapped or divided into a plurality of sectors, where each sector is a portion of the region 602. A subset of sectors is selected from the plurality of sectors 604.

A sensing device from within each sector in the subset of sectors is then selected 606. Such selection may be done based on intra-sector spatial randomness. In one example, the same number of devices from each sector in the subset of sectors is used to collect information. In one example, randomly selecting a device from within each sector in the subset of sectors may include: (a) selecting a location within each sector in the subset of sectors, (b) identifying a first device that is closest to that location, and/or (c) requesting the first device to scan a particular frequency spectrum band and indicate whether signal energy above a particular threshold is detected.

Additionally, a time slot within a sensing window period is selected 608. Such selection may be done based on temporal randomness. For instance, the sensing window period may have a fixed time interval T, but the start of the time slot is randomly selected for each sensing window period. This sensing window period may be the period during which sensing devices attempt to detect whether a signal is present in a particular spectrum band.

Optionally, the information collection center may send a message to the selected sensing devices to collect frequency spectrum usage information at the selected time slot for a particular frequency spectrum band 610.

Sensing reports are then received, obtained, and/or collected from the selected sensing devices, where each sensing report is indicative of whether the reporting sensing device detected a signal energy above a particular threshold for the frequency spectrum band 612. For instance, each sensing report may include the frequency spectrum usage information detected by a particular sensing device. Each report may be considered a vote in a voting scheme that is implemented by the information collection center to determine whether a particular frequency spectrum band or channel can be used. Thus, the information collection center may then determine whether a desired frequency spectrum band or channel can be used based on the sensing reports 614. For example, the desired frequency spectrum band can be used if the number of sensing reports indicating that no signal energy was detected is greater than the sensing reports indicating that a signal was detected.

Example Sensing Device

Figure 7:
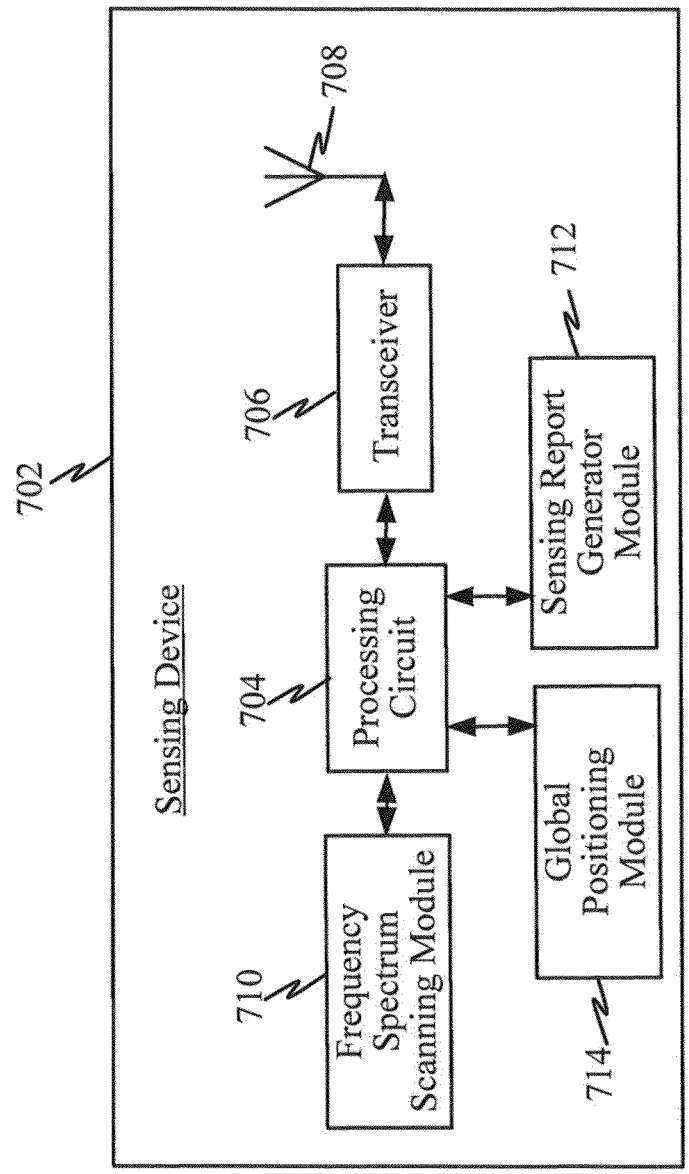
FIG. 7 is a block diagram illustrating an example of a sensing device that may operate within a cognitive wireless network to collect and/or report information related to frequency spectrum usage to a network entity.

FIG. 7 is a block diagram illustrating an example of a sensing device that may operate within a cognitive wireless network to collect and/or report information related to frequency spectrum usage to a network entity (e.g., information collection center). The sensing device 702 may comprise a processing circuit 704 coupled to a transceiver 706 that facilitates communications over the cognitive wireless network by transmitting and/or receiving signals via an antenna 708. The sensing device 702 may include a frequency spectrum scanning module 710 configured to scan a particular frequency spectrum band or channel and determine whether a signal energy above a threshold is detected. The sensing device 702 may also include a global positioning module 714 to ascertain its own geographical position within a network region. Such geographical position may be an absolute position or a relative position. A sensing report generator module 712 may then compile position information and/or frequency usage information (from the frequency spectrum scanning module 710) and transmits it an information collection center for the wireless network.

Figure 8:
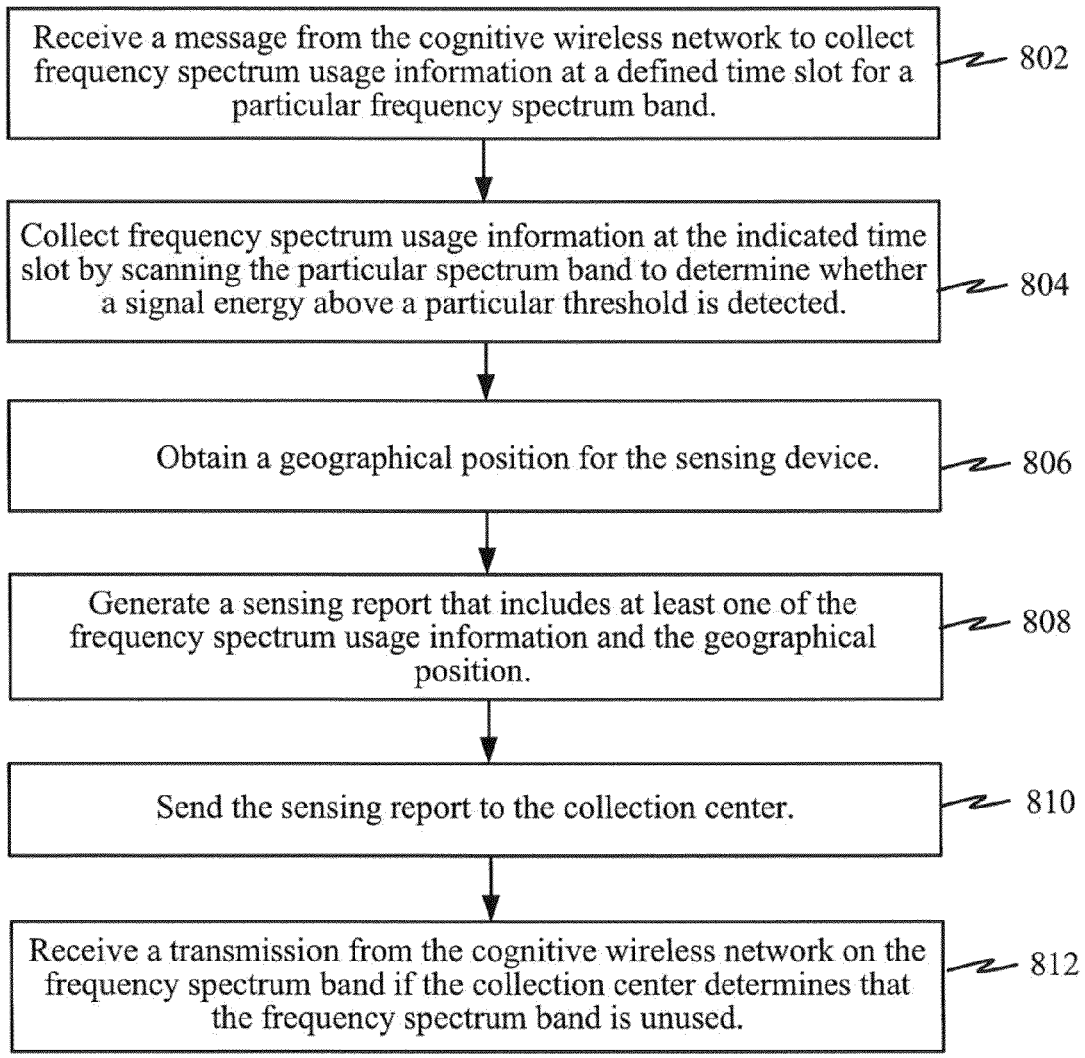
FIG. 8 is a diagram illustrating a method operational in a sensing device for providing frequency spectrum usage information to a collection center for a cognitive wireless network.

FIG. 8 is a diagram illustrating a method operational in a sensing device for providing frequency spectrum usage information to a collection center for a cognitive wireless network. A message may be received from the cognitive wireless network to collect frequency spectrum usage information at a defined time slot for a particular frequency spectrum band 802. Consequently, the sensing device may collect frequency spectrum usage information at the indicated time slot by scanning the particular spectrum band to determine whether a signal energy above a particular threshold is detected 804. The sensing device may also obtain a geographical position for the sensing device 806. A sensing report may then be generated that includes at least one of the frequency spectrum usage information and the geographical position 808. The sensing report may then be sent to the collection center 810. Subsequently, the sensing device may receive a transmission from the cognitive wireless network on the frequency spectrum band if the collection center determines that the frequency spectrum band is unused 812.

One or more of the components, steps, and/or functions illustrated in FIGS. 1, 2, 3, 4, 5, 6, 7, and/or 8 may be rearranged and/or combined into a single component, step, or function or embodied in several components, steps, or functions without the features described herein. Additional elements, components, steps, and/or functions may also be added without departing from the invention. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in a sensing device for providing frequency spectrum usage information to a collection center for a cognitive wireless network, comprising:
   receiving a message from the cognitive wireless network to collect frequency spectrum usage information at a randomly selected time slot within each period of a plurality of defined time periods for a particular frequency spectrum band, the defined time periods having the same duration;
   generating a sensing report that includes the frequency spectrum usage information; and
   sending the sensing report to the collection center.

2. The method of claim 1, further comprising:
   obtaining a geographical position for the sensing device; and
   including the geographical position as part of the sensing report.

3. The method of claim 1, further comprising:
   collecting frequency spectrum usage information at the randomly selected time slot.

4. The method of claim 1, wherein collecting the frequency spectrum usage information includes scanning the particular spectrum band to determine whether a signal energy above a particular threshold is detected.

5. The method of claim 1, further comprising:
receiving a transmission from the cognitive wireless network on the frequency spectrum band if the collection center determines that the frequency spectrum band is unused.

6. The method of claim 1, wherein one of the defined time periods comprises two randomly selected time slots for collecting frequency spectrum usage information.

7. The method of claim 1, wherein two of the defined time periods comprise different number of randomly selected time slots for collecting frequency spectrum usage information.

8. The method of claim 1, wherein the randomly selected time slot extends over two adjacent periods of the defined time periods.

9. A sensing device adapted to provide frequency spectrum usage information to a collection center for a cognitive wireless network, comprising:
a transceiver for receiving a message from the cognitive wireless network to collect frequency spectrum usage information at a randomly selected time slot within each period of a plurality of defined time periods for a particular frequency spectrum band, the defined time periods having the same duration; and
a sensing report generator module for generating a sensing report that includes the frequency spectrum usage information,
wherein the sensing report is sent to the collection center via the transceiver.

10. The device of claim 9, further comprising:
a global positioning module for obtaining a geographical position for the sensing device,
wherein the sensing report generator module is adapted to include the geographical position as part of the sensing report.

11. The device of claim 9, further comprising:
a scanning module adapted to collect the frequency spectrum usage information at the randomly selected time slot by scanning the particular spectrum band to determine whether a signal energy above a particular threshold is detected.

12. A sensing device adapted to provide frequency spectrum usage information to a collection center for a cognitive wireless network, comprising:
means for receiving a message from the cognitive wireless network to collect frequency spectrum usage information at a randomly selected time slot within each period of a plurality of defined time periods for a particular frequency spectrum band, the defined time periods having the same duration; and
means for generating a sensing report that includes the frequency spectrum usage information; and
means for sending the sensing report to the collection center.

13. The device of claim 12, further comprising:
means for collecting the frequency spectrum usage information at the randomly selected time slot by scanning the particular spectrum band to determine whether a signal energy above a particular threshold is detected.

14. A processor including a processing circuit adapted to:
receive a message from a cognitive wireless network to collect frequency spectrum usage information at a randomly selected time slot within each period of a plurality of defined time periods for a particular frequency spectrum band, the defined time periods having the same duration;
generate a sensing report that includes the frequency spectrum usage information; and
send the sensing report to a collection center of the cognitive wireless network.

15. A non-transitory machine-readable storage medium comprising instructions operational in a sensing device for providing frequency spectrum usage information to a collection center for a cognitive wireless network, which when executed by one or more processors causes the processors to:
receive a message from a cognitive wireless network to collect frequency spectrum usage information at a randomly selected time slot within each period of a plurality of defined time periods for a particular frequency spectrum band, the defined time periods having the same duration;
generate a sensing report that includes the frequency spectrum usage information; and
send the sensing report to a collection center of the cognitive wireless network.

* * * * *